(12) United States Patent
Kazuno

(10) Patent No.: US 12,172,529 B2
(45) Date of Patent: Dec. 24, 2024

(54) SYSTEM AND METHOD

(71) Applicant: HONDA MOTOR CO., LTD., Tokyo (JP)

(72) Inventor: Shuichi Kazuno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 17/852,376

(22) Filed: Jun. 29, 2022

(65) Prior Publication Data

US 2023/0001798 A1 Jan. 5, 2023

(30) Foreign Application Priority Data

Jul. 1, 2021 (JP) .................. 2021-110067

(51) Int. Cl.
*B60L 3/12* (2006.01)
*B60W 40/06* (2012.01)

(52) U.S. Cl.
CPC .............. *B60L 3/12* (2013.01); *B60W 40/06* (2013.01); *B60L 2240/14* (2013.01); *B60L 2240/421* (2013.01); *B60L 2240/423* (2013.01); *B60L 2240/425* (2013.01); *B60L 2240/64* (2013.01)

(58) Field of Classification Search
CPC .... B60L 3/12; B60L 2240/14; B60L 2240/42; B60L 2240/423; B60L 2240/425; B60L 2240/64; B60L 2240/622; B60L 2240/647; B60L 2240/70; G01C 21/12; G01C 21/34; G01C 21/3691; G01C 21/3815; B60W 40/06; G01N 19/08
See application file for complete search history.

(56) References Cited

U.S. PATENT DOCUMENTS

| | | | |
|---|---|---|---|
| 9,857,252 B2 * | 1/2018 | Murugesan | G01L 3/10 |
| 10,040,509 B1 * | 8/2018 | Lee | H04W 4/029 |
| 2016/0144928 A1 * | 5/2016 | Chun | B62M 6/45 701/22 |
| 2018/0040090 A1 * | 2/2018 | Troemel, Jr. | B60W 40/06 |
| 2018/0065640 A1 * | 3/2018 | Barthel | B60W 30/143 |

(Continued)

FOREIGN PATENT DOCUMENTS

| | | |
|---|---|---|
| JP | 2005160270 A | 6/2005 |
| JP | 2010213533 A | 9/2010 |

(Continued)

*Primary Examiner* — George C Jin

(57) ABSTRACT

A system comprises an acceleration information acquisition unit configured to acquire information indicating an acceleration of a vehicle; a shaft output information acquisition unit configured to acquire information indicating a shaft output of a rotating electrical machine; a position information acquisition unit configured to acquire information indicating a position of the vehicle; and a determination unit configured to determine a state of a road on which the vehicle has run, based on the acceleration of the vehicle, the shaft output, and the position of the vehicle. A method comprises acquiring information indicating an acceleration of a vehicle; acquiring information indicating a shaft output of a rotating electrical machine; acquiring information indicating a position of the vehicle; and determining a state of a road on which the vehicle has run, based on the acceleration of the vehicle, the shaft output, and the position of the vehicle.

17 Claims, 10 Drawing Sheets

(56) References Cited

U.S. PATENT DOCUMENTS

| | | | |
|---|---|---|---|
| 2018/0236894 A1 | 8/2018 | Bandai | |
| 2019/0001952 A1* | 1/2019 | Ienaga | B60W 30/18172 |
| 2019/0092335 A1* | 3/2019 | Kim | B62D 6/008 |
| 2020/0211043 A1 | 7/2020 | Hori | |
| 2020/0311444 A1* | 10/2020 | Oishi | G06V 20/56 |
| 2020/0378945 A1* | 12/2020 | Yamamoto | G01N 19/08 |
| 2022/0397414 A1* | 12/2022 | Homma | G01C 21/3889 |

FOREIGN PATENT DOCUMENTS

| | | | |
|---|---|---|---|
| JP | 2018137900 A | 8/2018 | |
| JP | 2020106398 A | 7/2020 | |

* cited by examiner

| VEHICLE ID | POSITION | SHAFT OUTPUT | TEMPER- ATURE | SPEED | TRAVELING DIRECTION ACCELERA- TION | VERTICAL DIRECTION ACCELERATION | TIME |

FIG.3

| POSITION INFORMATION | ROAD STATE |
|---|---|
| POSITION 1 | FOURTH STATE |
| POSITION 2 | FOURTH STATE |
| POSITION 3 | FOURTH STATE |
| POSITION 4 | FOURTH STATE |
| POSITION 5 | FOURTH STATE |
| POSITION 6 | FOURTH STATE |
| ⋮ | ⋮ |

*FIG.7*

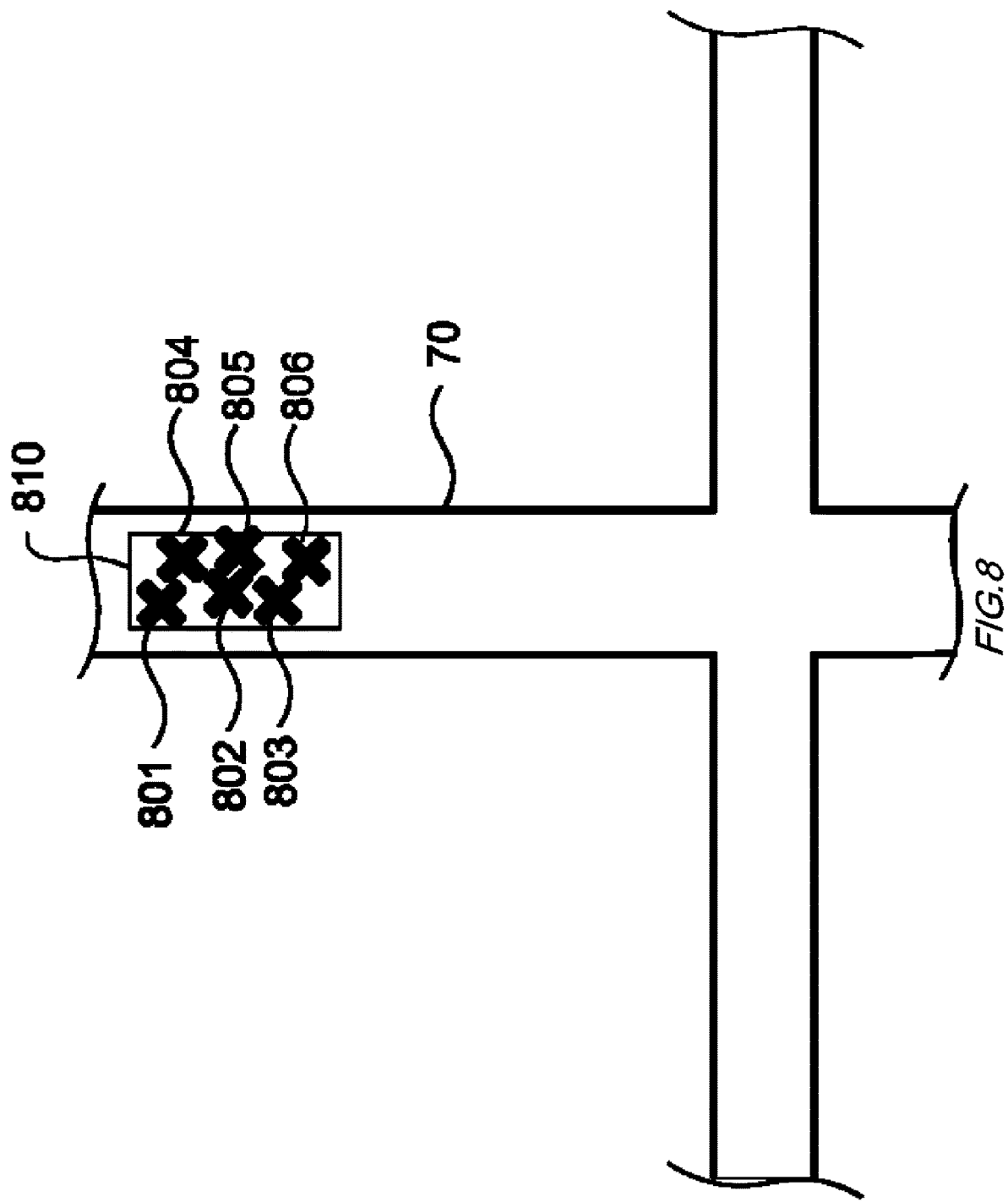

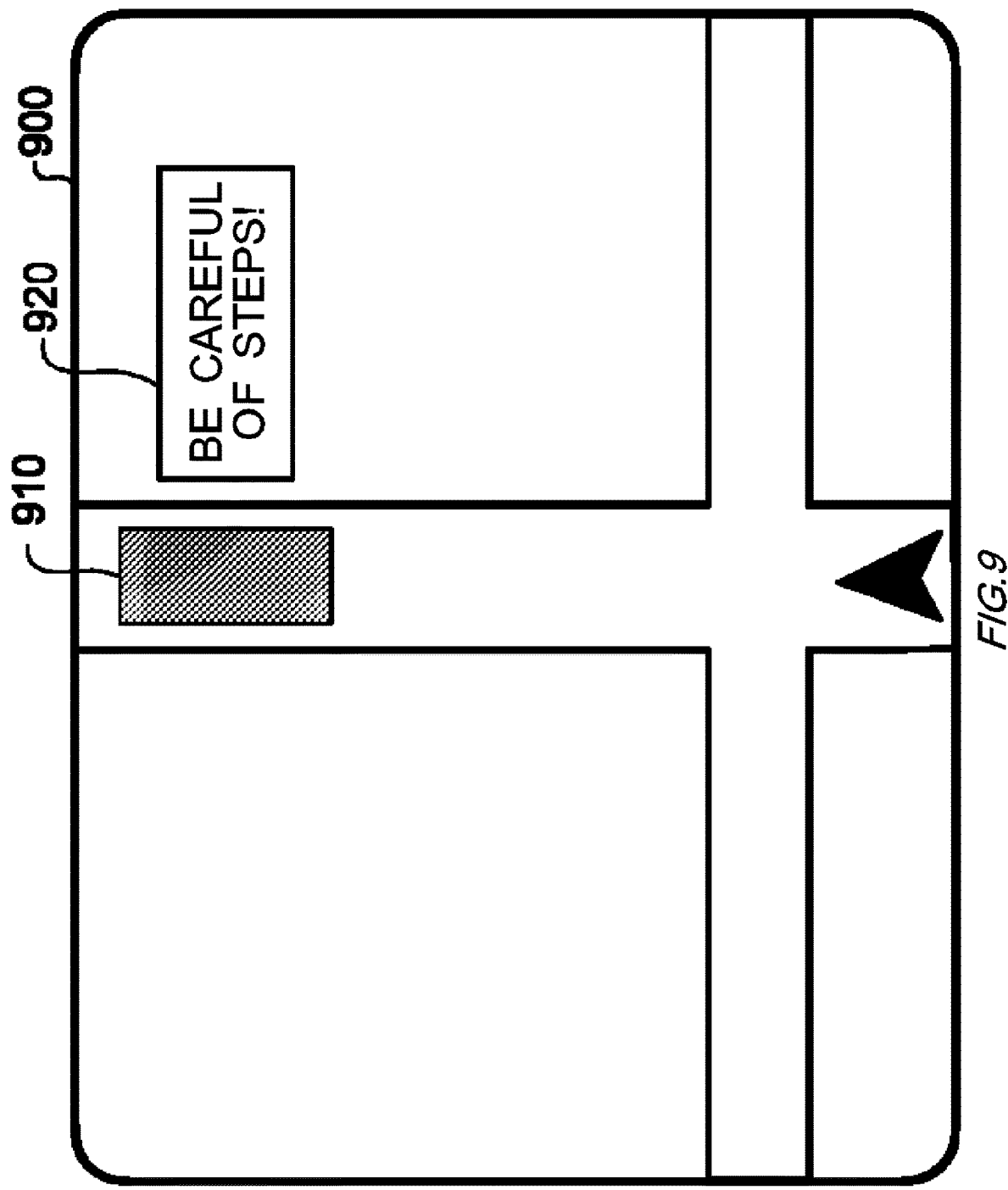

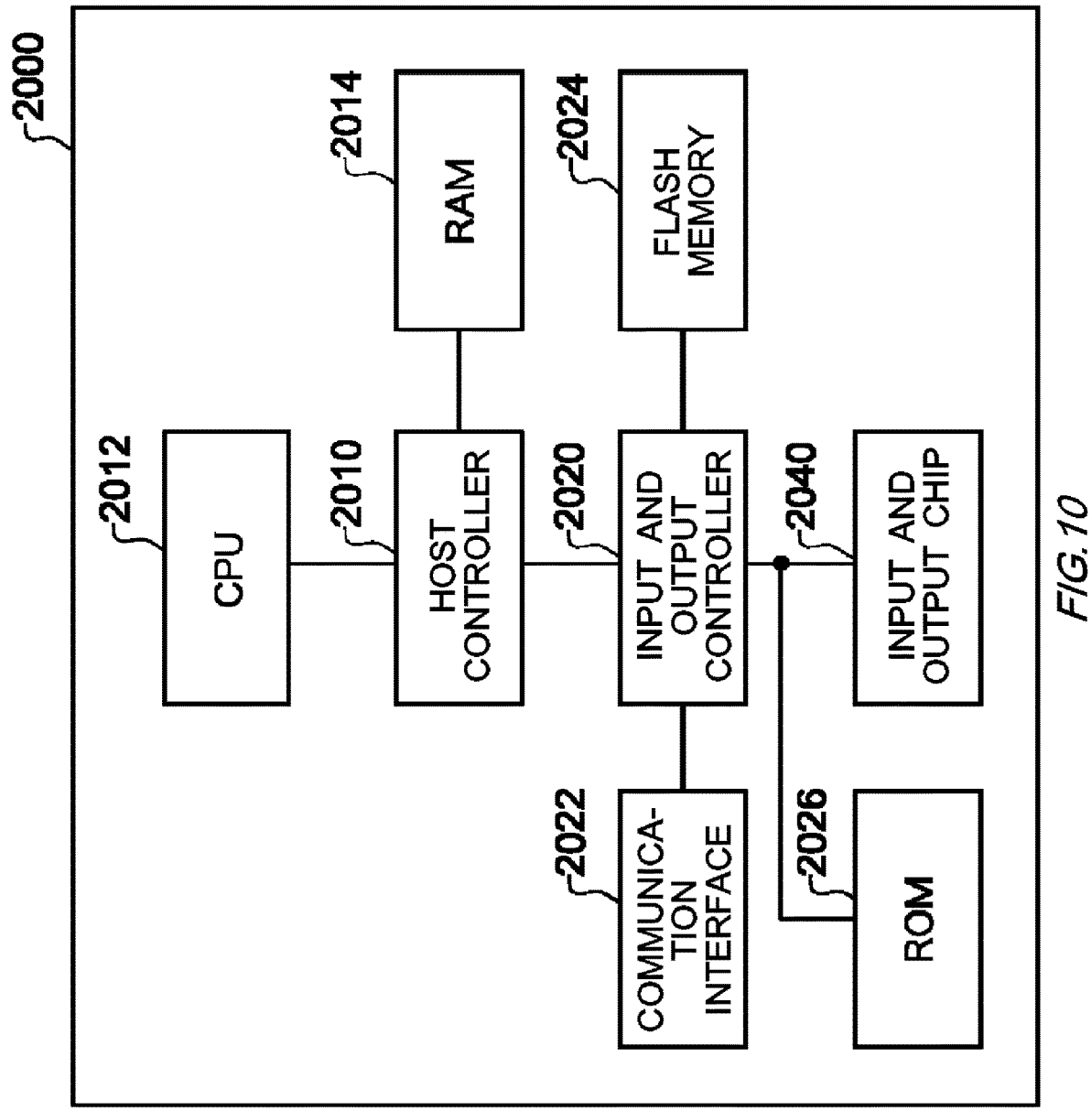

SYSTEM AND METHOD

The contents of the following Japanese patent application (s) are incorporated herein by reference:
NO. 2021-110067 filed on Jul. 1, 2021.

BACKGROUND

1. Technical Field

The present invention relates to a system and a method.

2. Related Art

Patent Document 1 discloses collecting information (for example, information including a position, a vehicle speed, an acceleration, and navigation information of each vehicle) relating to a running state of each vehicle by automatically communicating with each running vehicle, and deriving, by using the collected information, a load that is applied to a specific vehicle when the specific vehicle runs on an estimated route. Patent Document 2 discloses that a navigation apparatus periodically and synchronously acquires outputs of a vehicle speed sensor, a gyro sensor, a GPS sensor and the like, calculates a running locus from these data, specifies a road on which the vehicle is running by comparing the running locus with road data in a map database, and specifies the road as a low-speed running section, based on an average value of a plurality of past running data. Patent Document 3 relates to an information providing system that provides a timing at which a vehicle needs to be refueled, disclosing uploading, to a server, vehicle state information such as a position state, a motion state, an operation state by a driver and a control state of a vehicle, and fuel consumption related information. Patent Document 4 discloses recording a past running history of an electric vehicle, and managing a use status of a drive motor, according to the running history.

PRIOR ART DOCUMENT

Patent Document

Patent Document 1: Japanese Patent Application Publication No. 2018-137900
Patent Document 2: Japanese Patent Application Publication No. 2005-160270
Patent Document 3: Japanese Patent Application Publication No. 2020-106398
Patent Document 4: Japanese Patent Application Publication No. 2010-213533

BRIEF DESCRIPTION OF THE DRAWINGS

FIG. 3 shows a data structure for storing detection information collected from a vehicle 20 by the system 100.

FIG. 7 shows a data structure of road state information including a determination result of the system 100.

FIG. 8 schematically shows a state in which a road state is plotted based on the road state information.

FIG. 9 schematically shows an example of a navigation screen 900 that is displayed by an in-vehicle system 22, based on display instruction information.

FIG. 10 shows an example of a computer 2000.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
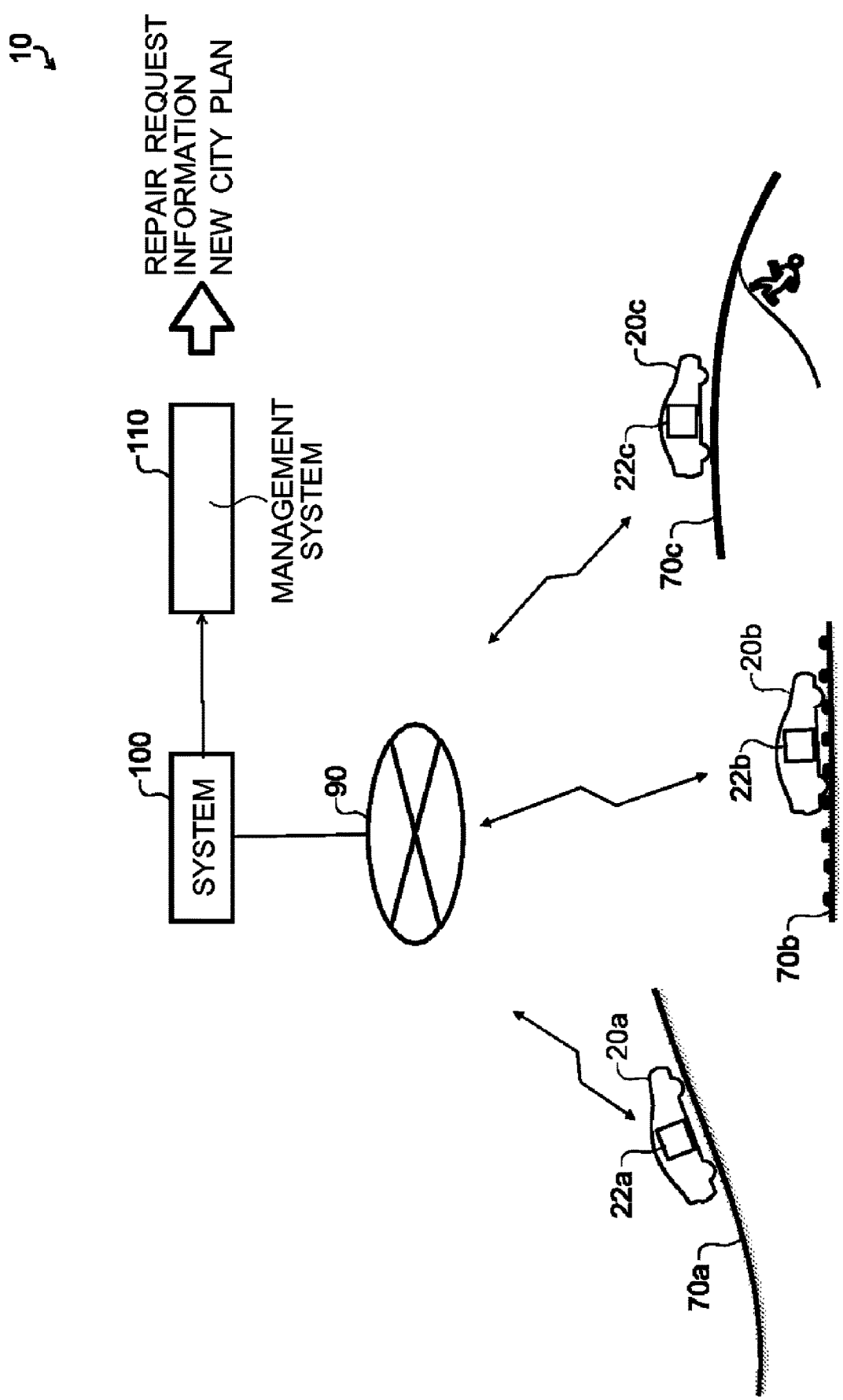
FIG. 1 shows an outline of an information system 10 according to one embodiment.

FIG. 1 shows an outline of an information system 10 according to one embodiment. The information system 10 comprises a system 100, a management system 110, and a vehicle 20a, a vehicle 20b, and a vehicle 20c.

The vehicle 20a includes an in-vehicle system 22a. The vehicle 20b includes an in-vehicle system 22b. The vehicle 20c includes an in-vehicle system 22c. In the present embodiment, the vehicle 20a, the vehicle 20b, and the vehicle 20c may be collectively referred to as 'vehicle 20'. In addition, the in-vehicle system 22a, the in-vehicle system 22b, and the in-vehicle system 22c may be collectively referred to as 'in-vehicle system 22'.

The vehicle 20 is an electric vehicle. The vehicle 20 includes a motor configured to generate power for the vehicle 20 to run. The vehicle 20 is configured to run by the power generated by the motor. In the present embodiment, the motor provided in the vehicle 20 is referred to as 'motor', unless otherwise mentioned. The motor is an example of the rotating electrical machine. The in-vehicle system 22 includes a sensor system including a position sensor configured to detect a current position of the vehicle 20, a speed sensor configured to detect a speed of the vehicle 20, an acceleration sensor configured to detect an acceleration of the vehicle 20, a shaft output sensor configured to detect a shaft output of the motor, and a temperature sensor configured to detect a temperature of the motor. Note that, the acceleration sensor is configured to detect an acceleration in a traveling direction and an acceleration in a vertical direction of the vehicle 20. The acceleration sensor may include an acceleration sensor configured to detect an acceleration for actuating an SRS airbag system provided in the vehicle 20. The position sensor may be a GNSS sensor configured to detect a position, based on signals received from GNSS (Global Navigation System) satellites. In the present embodiment, the shaft output of the motor is referred to as 'shaft output', and the temperature of the motor is referred to as 'temperature', unless otherwise mentioned.

The in-vehicle system 22 includes a navigation system for navigating running of the vehicle 20. The in-vehicle system 22 has a communication function of communicating with the system 100 via a communication network 90. The communication function of the in-vehicle system 22 may be a communication function provided in the navigation system. The communication network 90 includes an IP network such as the Internet, a P2P network, a dedicated line including a VPN, a virtual network, a mobile communication network, and the like. The in-vehicle system 22 is configured to transmit detection information, which includes information indicating a position, a speed, an acceleration, a shaft output of the motor, and a temperature of the motor detected by the sensor system, to the system 100 via the communication network 90.

The system 100 is configured to determine a state of a road on which the vehicle 20 has run, based on the information indicating a position, a speed, an acceleration, a shaft output of the motor and a temperature of the motor included in the detection information received from the in-vehicle system 22 provided in each vehicle 20. As an example, based on the information detected by the in-vehicle system 22*a* within a predetermined period during which the vehicle 20*a* is running on a road 70*a*, the system 100 is configured to determine that a section in which the vehicle 20*a* has run on the road 70*a* within the period is in a state where a running load is a 'high load', when a time during which the shaft output of the motor becomes equal to or greater than a predetermined threshold value continues for a predetermined time or longer and the temperature of the motor becomes equal to or greater than a predetermined temperature value. In addition, based on the information detected by the in-vehicle system 22*b* within a predetermined period during which the vehicle 20*b* is running on a road 70*b*, the system 100 is configured to determine that a section in which the vehicle 20*b* has run on the road 70*b* within the period is in a 'rough road and stepped' state, when a number of times per a unit time that a vertical direction component of the acceleration exceeds a predetermined threshold value exceeds a predetermined threshold value, the shaft output of the motor is equal to or greater than a predetermined second output value and the speed is a predetermined speed threshold value. In addition, based on the information detected by the in-vehicle system 22*c* within a predetermined period during which the vehicle 20*c* is running on a road 70*c*, the system 100 is configured to determine that a section in which the vehicle 20*c* has run on the road 70*c* within the period is in a 'poor view and jumping-out' state, when a number of times per a unit time that a traveling direction component of the acceleration exceeds a predetermined threshold value exceeds a predetermined second number of times and the shaft output is less than a predetermined third output value. In addition, the system 100 is configured to determine a type of the road state such as 'low μ road', 'rough road', 'poor view' and 'poor view and blind spot'.

The system 100 is configured to determine the state of the road, based on the information collected from the large number of vehicles 20, and to accumulate a determination result. The system 100 is configured to confirm the state of the road, based on the number of times of appearances of the accumulated determination result. The system 100 is configured to transmit information indicating the confirmed state of the road to the vehicle 20 and to cause the navigation system to output the information. For example, the in-vehicle system 22 of the vehicle 20 is configured to specify a state of a road ahead of the running route of the vehicle 20, based on the information provided from the system 100, and to display the information indicating the specified state of the road on the navigation screen, as caution information. In addition, the system 100 is configured to transmit the information indicating the confirmed state of the road to a management system 110. The management system 110 is a system configured to generate road repair request information and new city plan information.

According to the information system 10, the state of the road can be determined in detail by using the acceleration and the shaft output of the motor detected by the vehicle 20. In addition, according to the information system 10, the state of the road can be determined in detail by using the shaft output of the motor and the temperature of the motor detected by the vehicle 20. Thereby, according to the information system 10, information indicating the detailed state of the road can be provided to the large number of vehicles 20, so that a navigation system having a high commercial value can be provided. Further, according to the information system 10, it is possible to contribute to a road repair plan and a new city plan in the future.

Figure 2:
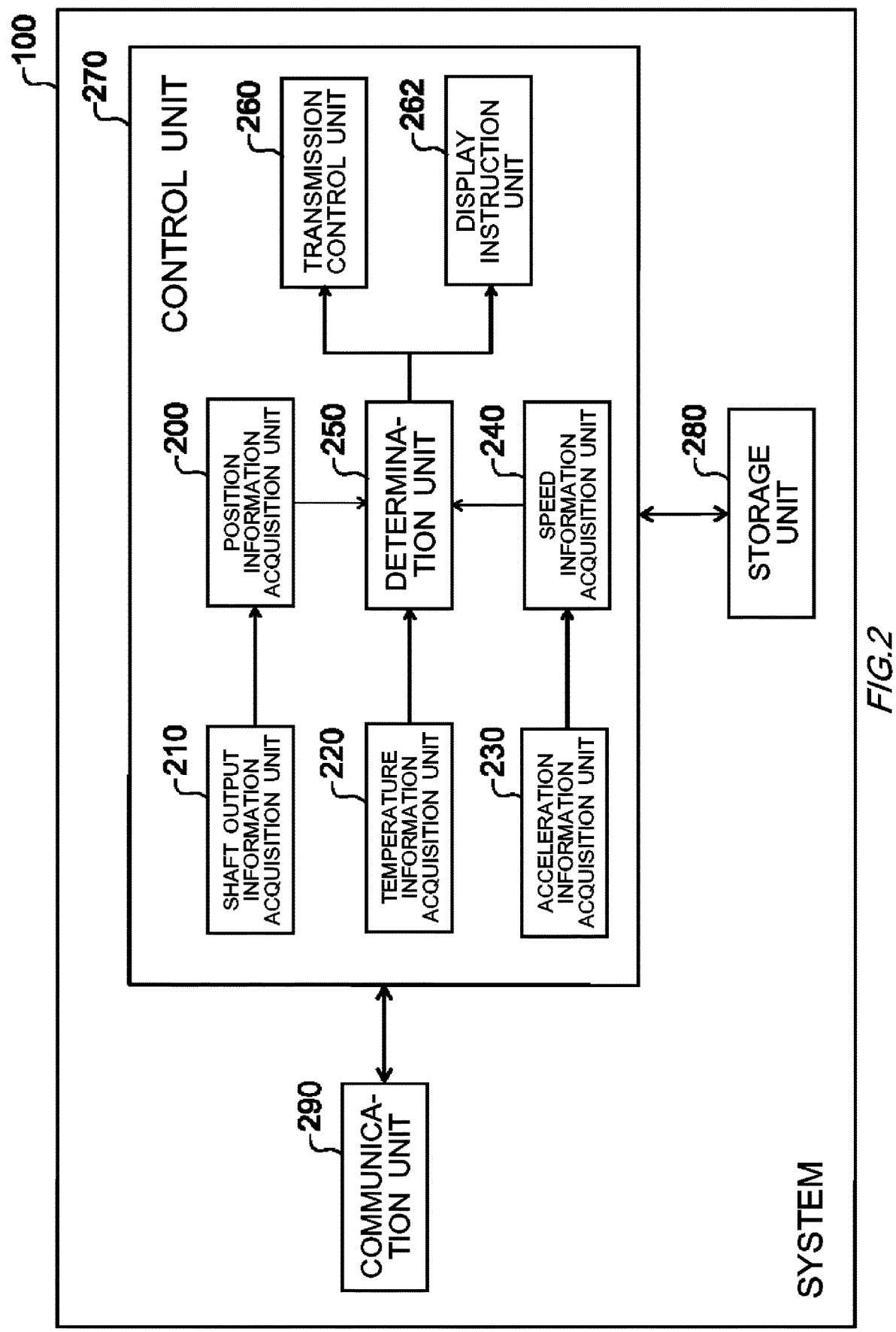
FIG. 2 shows a functional configuration of a system 100.

FIG. 2 shows a functional configuration of the system 100. The system 100 comprises a control unit 270, a communication unit 290, and a storage unit 280.

The control unit 270 is configured to control the storage unit 280 and the communication unit 290. The communication unit 290 is responsible for communication with the in-vehicle system 22. For example, the communication unit 290 is configured to receive the detection information transmitted from the in-vehicle system 22. The communication unit 290 is further responsible for communication with the management system 110. The control unit 270 is implemented by a circuit such as an arithmetic processing apparatus including a processor, for example. The storage unit 280 is implemented with a non-volatile storage medium. The control unit 270 is configured to perform processing by using information stored in the storage unit 280. The control unit 270 may be implemented by a microcomputer including a CPU, a ROM, a RAM, an I/O, a bus, and the like. Note that, the system 100 may be implemented by a single computer, or may be implemented by a plurality of computers.

The control unit 270 includes a position information acquisition unit 200, a shaft output information acquisition unit 210, an acceleration information acquisition unit 230, a speed information acquisition unit 240, a determination unit 250, a transmission control unit 260, and a display instruction unit 262.

The position information acquisition unit 200 is configured to acquire information indicating a position of the vehicle 20. Note that, the information indicating the position of the vehicle 20 may be information detected by the in-vehicle system 22, or may be position information detected by a mobile terminal such as a smart phone carried by an occupant of the vehicle 20.

The shaft output information acquisition unit 210 is configured to acquire information indicating a shaft output of the motor mounted on the vehicle 20. The shaft output can also be called a braking horsepower, a net horsepower, or the like. The shaft output may be calculated from detected values of a torque and a number of rotations of the output shaft of the motor. The temperature information acquisition unit 220 is configured to acquire information indicating a temperature of the motor. The acceleration information acquisition unit 230 is configured to acquire information indicating an acceleration of the vehicle 20 detected by the acceleration sensor mounted on the vehicle 20. The speed information acquisition unit 240 is configured to acquire information indicating a speed of the vehicle 20. The position information acquisition unit 200, the shaft output information acquisition unit 210, the acceleration information acquisition unit 230 and the speed information acquisition unit 240 are configured to acquire the information indicating a position, a shaft output, a temperature, an acceleration and a speed from the information included in the detection information transmitted from the in-vehicle system 22, respectively.

The determination unit 250 is configured to determine a state of a road on which the vehicle 20 has run, based on the acceleration of the vehicle 20, the shaft output and the position of the vehicle 20. For example, when the shaft output is less than a predetermined first shaft output value, the determination unit 250 is configured to determine the state of the road as a first state, and when a time during which the shaft output is equal to or greater than the first shaft output value is equal to or longer than a predetermined first time and the temperature of the motor is equal to or greater than a predetermined first temperature value, the determination unit is configured to determine the state of the road as a second state. The determination unit 250 is configured to determine the state of the road as a third state when the time during which the shaft output is equal to or greater than the first shaft output value is shorter than a second time shorter than the first time. The determination unit 250 is configured to determine the state of the road as a fourth state when a number of times per a unit time that the vertical direction component of the acceleration exceeds a predetermined first acceleration value is more than a predetermined first number of times, the shaft output is equal to or greater than a predetermined second shaft output value and the speed of the vehicle 20 is equal to or less than a predetermined speed value. The determination unit 250 may be configured to further determine the state of the road as the fourth state when the number of times per a unit time that the vertical direction component of the acceleration exceeds the predetermined first acceleration value is more than the predetermined first number of times, the temperature is equal to or greater than a predetermined second temperature value and the speed of the vehicle 20 is equal to or less than the predetermined speed value. In this way, the determination unit 250 may be configured to determine the state of the road as the fourth state when the number of times per a unit time that the vertical direction component of the acceleration exceeds the predetermined first acceleration value is more than the predetermined first number of times, the temperature is equal to or greater than the predetermined second temperature value and the speed of the vehicle 20 is equal to or less than the predetermined speed value.

The determination unit 250 is configured to determine the state of the road as a fifth state when a number of times per a unit time that the traveling direction component of the acceleration exceeds a predetermined second acceleration value is more than a predetermined second number of times. The determination unit 250 is configured to determine the state of the road as a sixth state when the number of times per a unit time that the traveling direction component of the acceleration exceeds the predetermined second acceleration value is more than the predetermined second number of times and the shaft output is equal to or less than a predetermined third shaft output value. The determination unit 250 is configured to determine the state of the road as a seventh state when the number of times per a unit time that the traveling direction component of the acceleration exceeds the predetermined second acceleration value is more than the predetermined second number of times and an average value of the shaft output in a predetermined time is within a predetermined range. Note that, the determination unit 250 may be configured to determine the state of the road on which the vehicle 20 has run, based on the shaft output, the temperature and the position of the vehicle 20. When the shaft output is less than the predetermined first shaft output value, the determination unit 250 may be configured to determine the state of the road as the first state, and when the time during which the shaft output is equal to or greater than the first shaft output value is equal to or longer than the predetermined first time and the temperature of the motor is equal to or greater than the predetermined first temperature value, the determination unit may be configured to determine the state of the road as the second state.

The display instruction unit 262 is configured to transmit information indicating the state of the road determined by the determination unit 250 to the plurality of vehicles 20, and to cause the plurality of vehicles 20 to display the state of the road. Specifically, the display instruction unit 262 is configured to transmit the state of the road to the in-vehicle system 22 via the communication unit 290, thereby causing the in-vehicle system 22 to display the state of the road. The display instruction unit 262 may be configured to cause the plurality of vehicles 20 to display the fourth state in a manner different from that of the fifth state. The transmission control unit 260 is configured to transmit the information, which indicates the state of the road determined by the determination unit 250, to the management system configured to manage the state of the road.

FIG. 3 shows a data structure for storing detection information collected from the vehicle 20 by the system 100. In the detection information, a vehicle ID, a position, a shaft output, a temperature, a traveling direction acceleration, a vertical direction acceleration, and a time are associated each other.

The 'vehicle ID' is identification information of the vehicle 20. A vehicle type of the vehicle 20 can be specified by the 'vehicle ID'. The identification information of the vehicle 20 is information stored in the in-vehicle system 22, and is transmitted from the in-vehicle system 22 with being included in the detection information. The 'position' is position information detected by the position sensor provided in the in-vehicle system 22. The 'shaft output' is a shaft output of the motor detected by the shaft output sensor provided in the in-vehicle system 22. The 'temperature' is a temperature of the motor detected by the temperature sensor provided in the in-vehicle system 22. The 'speed' is a speed detected by the speed sensor provided in the in-vehicle system 22. The 'traveling direction acceleration' is a traveling direction component of the acceleration detected by the acceleration sensor provided in the in-vehicle system 22. The 'vertical direction acceleration' is a vertical direction component of the acceleration detected by the acceleration sensor provided in the in-vehicle system 22. The 'time' is a time at which the position, the shaft output, the temperature, the traveling direction acceleration, and the vertical direction acceleration are detected by the in-vehicle system 22 of the vehicle 20.

Figure 4:
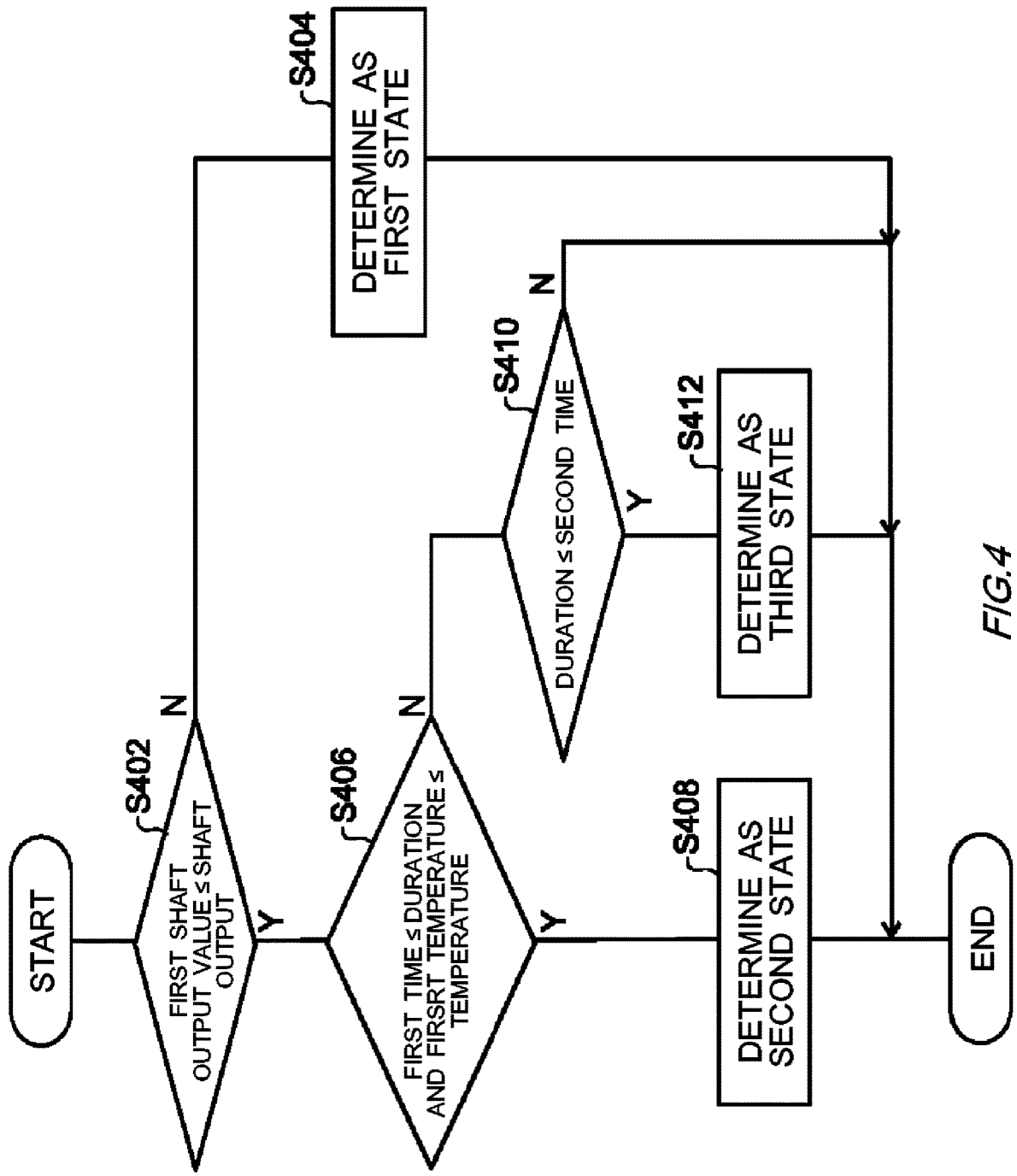
FIG. 4 shows an example of a flowchart showing a procedure relating to a determination method that is executed by the system 100.

FIG. 4 shows an example of a flowchart showing a procedure relating to a determination method that is executed by the system 100.

In S402, the determination unit 250 determines whether or not the shaft output is equal to or less than the first shaft output value. The first shaft output value is, for example, 60 kW. When the shaft output is less than the first shaft output value, in S404, the determination unit 250 determines the state of the road as a first state. The first state indicates that the road is in a normal state. The normal state may indicate, for example, a state where the running load of the vehicle 20 is not relatively high.

When the shaft output exceeds the first shaft output value, in S406, the determination unit 250 determines whether or not a duration time, which is a time during which the shaft output is equal to or greater than the first shaft output value, is equal to or longer than the first time and the temperature of the motor is equal to or greater than the first temperature value. When the duration time is equal to or longer than the first time and the temperature of the motor is equal to or greater than the first temperature value, in S408, the determination unit 250 determines the state of the road as a second state. The second state indicates, for example, that the state of the road is 'high load'. The 'high load' indicates a road on which the running load of the vehicle is high. The first time may be, for example, 20 seconds. The first temperature may be, for example, 80° C.

In general, the shaft output while running on an expressway at a speed of 80 km/h is often about 20 kW. When a state where the shaft output exceeds 60 kW continues for 20 seconds or longer, it is often determined that the vehicle was running on an uphill whose inclination is at least 4% or more. For this reason, by using the duration time of the shaft output, the state of the road can be determined in detail. Note that, the first shaft output value, the first time, and the first temperature may be values that are determined according to each vehicle type identified by the vehicle ID. The first shaft output value, the first time and the first temperature may be values that are determined according to the country or region in which the vehicle is used.

When it is determined in the determination of S406 that the duration time is less than the first time or the temperature of the motor is less than the first temperature value, in S410, the determination unit 250 determines whether or not the duration time is equal to or less than the second time. When the duration time is equal to or less than the second time, in S412, the determination unit 250 determines the state of the road as a third state. The third state indicates, for example, a state in which the road surface is a 'low μ road' having a low coefficient of friction. The second shaft output value is, for example, −10 kW. The second time is a time shorter than at least the first time. The second time may be a time shorter than one second. The second time may be a value that is determined for each vehicle type identified by the vehicle ID. The second time may be a value that is determined by the country or region in which the vehicle is used. Note that, when it is determined in the determination of S410 that the duration time is equal to or less than the second time, the processing of the present flowchart is ended without determining the state of the road.

Figure 5:
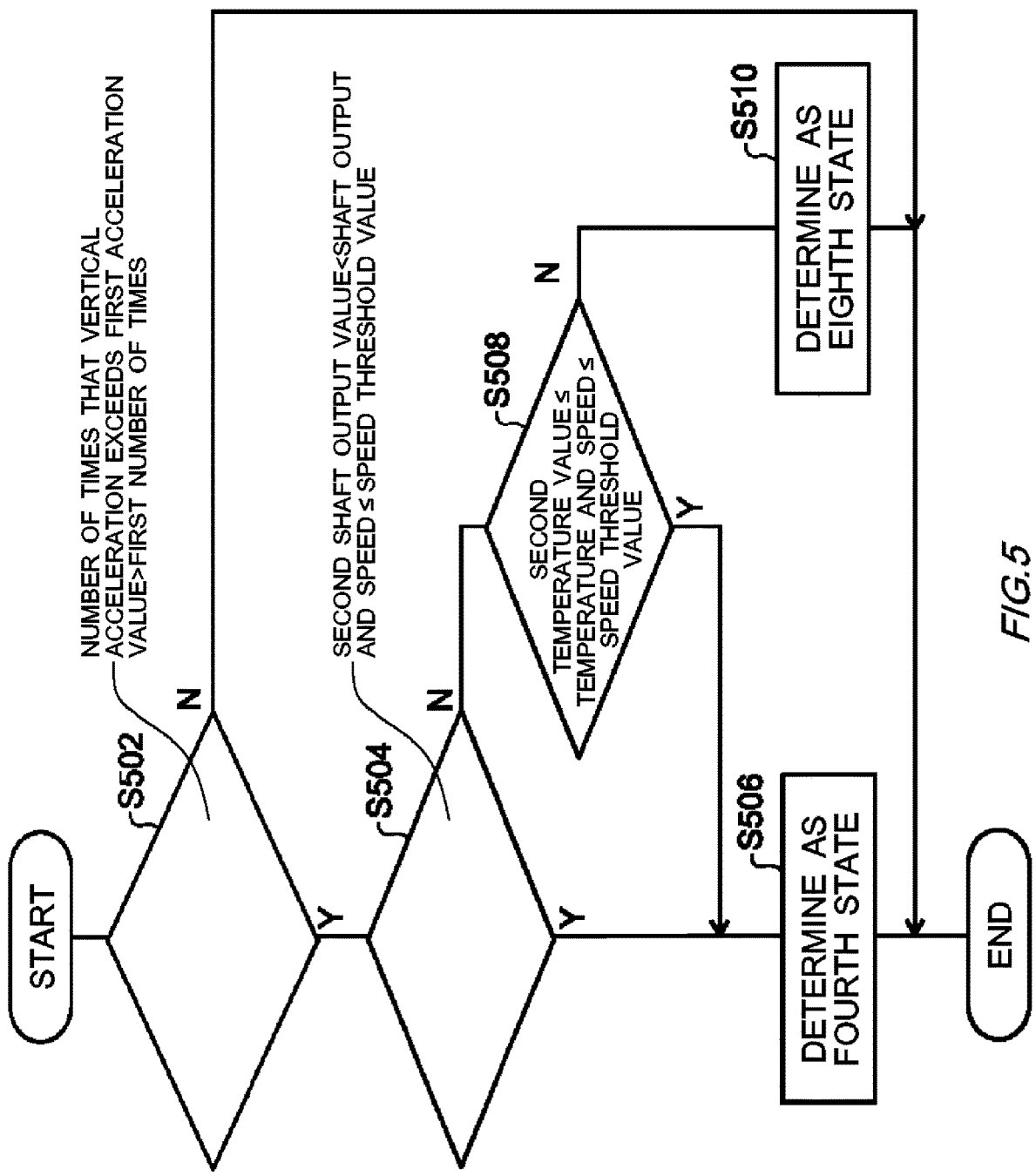
FIG. 5 shows an example of a flowchart showing a procedure relating to a determination method that is executed by the system 100.

FIG. 5 shows an example of a flowchart showing a procedure relating to a determination method that is executed by the system 100. The processing of the flowchart of FIG. 5 may be executed in parallel with the processing of the flowchart of FIG. 4.

In S502, the determination unit 250 determines whether or not a number of times per a unit time that the vertical direction acceleration exceeds the first acceleration value is more than the first number of times. When the number of times per a unit time that the vertical direction acceleration exceeds the first acceleration value is equal to or less than the first number of times, the processing of the present flowchart is ended without determining the state of the road. Note that, the first acceleration value may be an average value of the vertical direction acceleration within a predetermined period, and the determination unit 250 may determine whether or not the number of times that the vertical direction acceleration exceeds the first acceleration value within the predetermined period is more than a predetermined number of times. When the number of times per a unit time that the vertical direction acceleration exceeds the first acceleration value is more than the first number of times, in S504, the determination unit 250 determines whether or not the shaft output is equal to or greater than the second shaft output value and the speed of the vehicle 20 is equal to or less that the predetermined speed value.

When the shaft output is equal to or greater than the second shaft output value and the speed of the vehicle 20 is equal to or less that the predetermined speed value, in S506, the determination unit 250 determines the state of the road as a fourth state. The fourth state indicates, for example, that the state of the road is a 'rough road and stepped' state. The 'rough road and stepped' indicates a state of a rough road with a relatively high step. The second shaft output value may be, for example, 20 kW. When running on a road surface with a step, the shaft output is often relatively high so as to override the step, even though the speed is relatively low. For this reason, by considering the speed and the shaft output, it is possible to appropriately determine whether or not the vehicle was running on a rough road with a step. Note that, the second shaft output value, the first acceleration value, and the first number of times may be values that are determined according to each vehicle type identified by the vehicle ID. The second shaft output value, the first acceleration value, and the first number of times may be values that are determined according to the country or region in which the vehicle is used.

When it is determined in the determination of S504 that the shaft output is equal to or less than the second shaft output value or the speed of the vehicle 20 exceeds the predetermined speed value, in S508, the determination unit 250 determines whether or not the temperature is equal to or greater than the predetermined second temperature value and the speed of the vehicle 20 is equal to or less than the predetermined speed value. When the temperature is equal to or greater than the predetermined second temperature value and the speed of the vehicle 20 is equal to or less than the predetermined speed value, in S506, the determination unit 250 determines the state of the road as the fourth state. When running on a road surface with a step, the motor output increases so as to override the step, so that the motor temperature may rise. In addition, an input to the motor increases due to deceleration after overriding the step, so that the motor temperature may rise. For this reason, by considering the speed and the temperature, it is possible to appropriately determine whether or not the vehicle was running on a rough road with a step. The second temperature value may be, for example, 50° C. Note that, the second temperature value may be a value that is determined for each vehicle type identified by the vehicle ID. The second temperature value may be a value that is determined by the country or region in which the vehicle is used.

When it is determined in the determination of S508 that the temperature is less than the predetermined second temperature value or the speed of the vehicle 20 is less than the predetermined speed value, in S510, the determination unit 250 determines the state of the road as an eighth state. The eighth state indicates, for example, that the state of the road is a 'rough load'. The 'rough road' indicates a state in which a road is a rough road but there is no substantial step or a step is relatively low.

Figure 6:
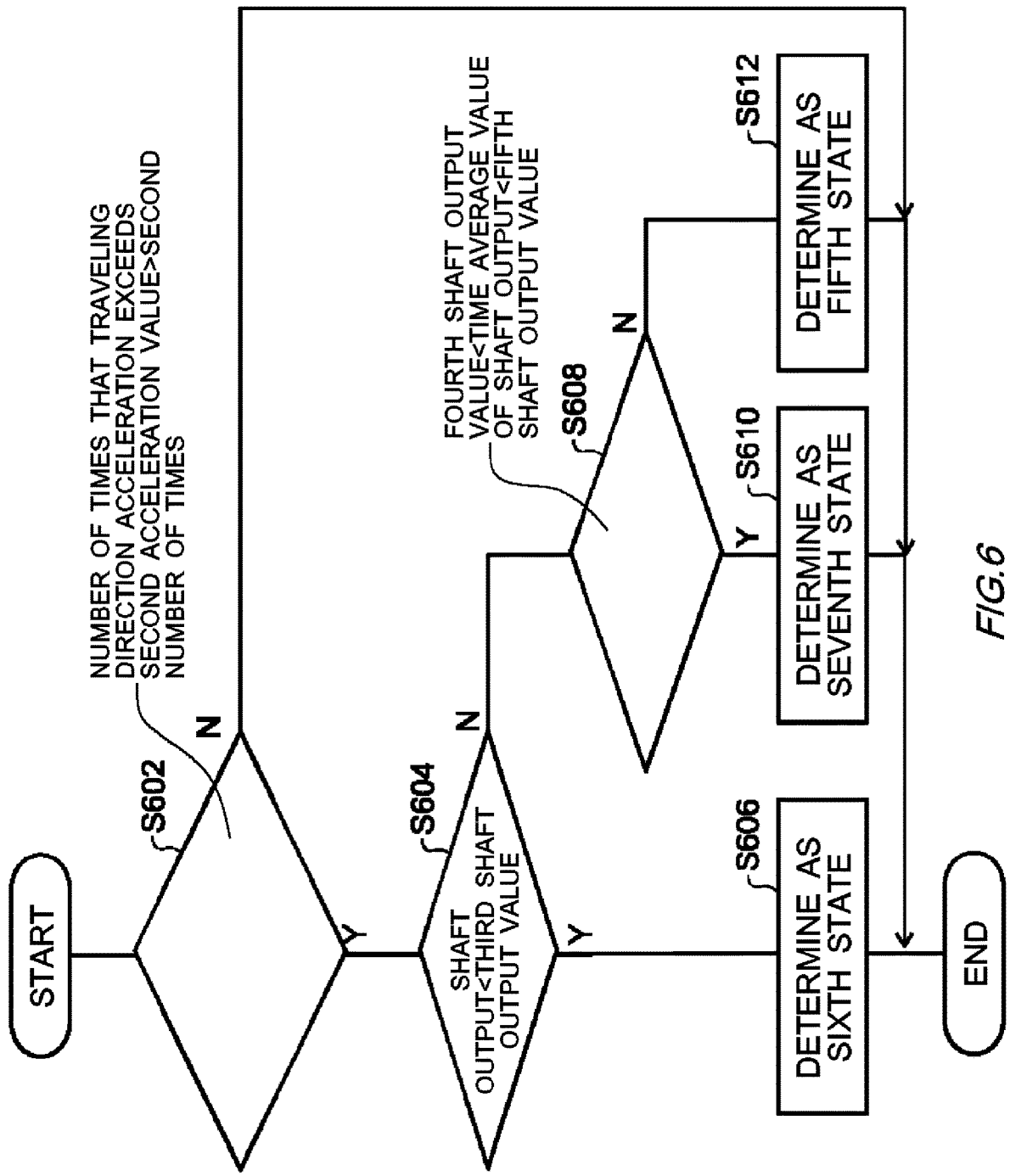
FIG. 6 shows an example of a flowchart showing a procedure relating to a determination method that is executed by the system 100.

FIG. 6 shows an example of a flowchart showing a procedure relating to the determination method that is executed by the system 100. The processing of the flowchart of FIG. 6 may be executed in parallel with the processing of the flowcharts of FIGS. 4 and 5.

In S602, the determination unit 250 determines whether or not the number of times per a unit time that the traveling direction acceleration exceeds the second acceleration value is more than the second number of times. When the number of times per a unit time that the traveling direction acceleration exceeds the second acceleration value is equal to or less than the second number of times, the processing of the present flowchart is ended without determining the state of the road. Note that, the second acceleration value may be an average value of the traveling direction acceleration within a predetermined period, and the determination unit 250 may determine whether or not the number of times that the traveling direction acceleration exceeds the second acceleration value within the predetermined period is more than a predetermined number of times. When the number of times per a unit time that the traveling direction acceleration exceeds the second acceleration value is more than the second number of times, in S604, the determination unit 250 determines whether or not the shaft output is less than the third shaft output value.

When the shaft output is less than the third shaft output value, in S606, the determination unit 250 determines the state of the road as a sixth state. The sixth state indicates, for example, that the road is in a 'poor view and jumping-out' state. The 'poor view and jumping-out' indicates that a view is poor and jumping-out such as a person has occurred. The third shaft output value may be, for example, −10 kW. When jumping-out of a person or an object has occurred, the vehicle 20 is suddenly decelerated so as to avoid the jumping-out, so that the shaft output is often instantaneously lowered. For this reason, by considering the acceleration and the shaft output, it is possible to appropriately determine whether or not the jumping-out has occurred. Note that, the third shaft output value, the second acceleration value, and the second number of times may be values that are determined according to each vehicle type identified by the vehicle ID. The third shaft output value, the second acceleration value, and the second number of times may be values that are determined according to the country or region in which the vehicle is used.

When it is determined in the determination of S604 that the shaft output is equal to or greater than the third shaft output value, in S608, the determination unit 250 determines whether or not a time average value of the shaft output within a predetermined period is within a predetermined range of a fourth shaft output value or more and a fifth shaft output value or less. The fourth shaft output value may be, for example, −5 kW, and the fifth shaft output value may be, for example, 3 kW. The predetermined period may be a period of about 3 to 10 seconds. When the time average value of the shaft output is within the predetermined range, in S610, the determination unit 250 determines the state of the road as a seventh state. The seventh state indicates, for example, that the road is in a 'poor view and blind spot' state. When running on a road with a poor view, a number of times that the speed of the vehicle 20 is increased or decreased increases. In addition, when running on a road with a blind spot, the running is often performed in a state where the shaft output of the motor is low. For this reason, by considering the acceleration and the shaft output, it is possible to appropriately determine whether or not the vehicle was running on a road with a poor view and a blind spot. Note that, the fourth shaft output value and the fifth acceleration value may be values that are determined according to each vehicle type identified by the vehicle ID. The fourth shaft output value and the fifth acceleration value may be values that are determined according to the country or region in which the vehicle is used.

When it is determined in the determination of S608 that the time average value of the shaft output is not within the predetermined range, in S612, the determination unit 250 determines the state of the road as a fifth state. The fifth state indicates that the road is in a 'poor view' state. The 'poor view' indicates a state in which a view is poor but there is no substantial blind spot and there is no jumping-out.

FIG. 7 shows a data structure of road state information including a determination result of the system 100. The road state information is stored in the storage unit 280. In the road state information, position information and a road state are associated with each other. The 'position information' is information indicating a point on a road. The 'position information' may be coordinate information represented by a latitude and a longitude, or the like. The 'position information' is determined based on the position of the vehicle 20 transmitted from the vehicle 20. The 'road state' indicates any one of the first state to the eighth state determined by the determination unit 250. Position 1 to position 6 shown in FIG. 7 indicate the position information determined as the fourth state by the determination unit 250, based on the information detected by the six vehicles 20. In this way, the system 100 accumulates information indicating the road state at each position on the road determined based on the information detected by each of the vehicles 20.

FIG. 8 schematically shows a state in which a road state is plotted based on the road state information. A point 801, a point 802, a point 803, a point 804, a point 805 and a point 806 are points represented by the position 1, the position 2, the position 3, the position 4, the position 5 and the position 6 in FIG. 7, respectively.

When the determination unit 250 determines the fourth state at a predetermined number or more of points included in a section 810, based on the road state information, the determination unit determines the section 810 as the fourth state. In this way, when the determination unit 250 determines that the road state is the same state at a predetermined number or more of points included in a section of a predetermined area, the determination unit determines that the section is a section in a specific state.

The display instruction unit 262 transmits, to the vehicle 20, display instruction information instructing the vehicle to display that the section 810 is in the fourth state. The display instruction information includes information indicating the section 810 and information identifying the road state of the section 810. Note that, the display instruction unit 262 may transmit the display instruction information to the vehicle 20 running toward the section 810. When a running-scheduled route of the vehicle 20 set in the navigation system includes the section 810, the display instruction unit 262 may instruct the vehicle to display that the section 810 is in the fourth state by transmitting the display instruction information.

In addition, the transmission control unit 260 transmits information indicating a state of the section 810 to the management system 110. For example, the transmission control unit 260 transmits, to the management system 110, information indicating a range of the section 810, information indicating that the section 810 is in the fourth state, and information indicating the number of cases where it has been determined that the section 810 is in the fourth state. The management system 110 determines whether or not the section 810 needs to be repaired or reconstructed, based on the information transmitted from the system 100, and when it is determined that the section 810 needs to be repaired or reconstructed, the management system transmits repair request information to an administrator of the road. Further, the management system 110 generates new city plan information, based on the information transmitted from the system 100, and transmits the generated information to a creator of a city plan.

FIG. 9 schematically shows an example of a navigation screen 900 that is displayed by the in-vehicle system 22, based on the display instruction information. The in-vehicle system 22 displays a mark 910 and a mark 920 indicating the section 810 and the road state of the section 810 shown in FIG. 8, on the navigation screen 900. The mark 910 indicates a range of the section 810 on the road. The mark 920 is caution information displayed in association with the mark 910, and indicates that the section 810 is in the fourth state.

Note that, the display instruction unit 262 may be configured to cause the in-vehicle system 22 to display the road state determined using the vertical direction acceleration in a manner different from that of the state of the road determined using the traveling direction acceleration. For example, the display instruction unit 262 may be configured to instruct the in-vehicle system 22 to emphatically display the fourth state, as compared to a case of displaying at least one of the fifth state, the sixth state and the seventh state. Specifically, the display instruction unit 262 may be configured to instruct the in-vehicle system 22 to display a mark indicating the fourth state darker than the fifth state. The display instruction unit 262 may be configured to instruct the in-vehicle system 22 to display the mark indicating the fourth state in a predetermined highlight color different from a display color of a mark indicating the fifth state. The display instruction unit 262 may be configured to transmit information, which instructs a display intensity of the road state, with being included in the display instruction information to the vehicle 20. Note that, the display instruction unit 262 may be configured to instruct the in-vehicle system 22 to display the information indicating the road state determined using the vertical direction acceleration, while not instructing the in-vehicle system 22 to display the information indicating the road state determined using the traveling direction acceleration.

In general, the traveling direction acceleration of the vehicle 20 is more influenced by a driving method of a driver than the vertical direction acceleration. For this reason, the display instruction unit 262 can appropriately present the driver of the vehicle 20 with the road state by displaying the road state determined using the vertical direction acceleration in a manner different from the road state determined using the traveling direction acceleration.

As described above, according to the information system 10, it is possible to determine the state of the road in detail by using the acceleration and the shaft output of the motor detected by the vehicle 20. In addition, according to the information system 10, it is possible to determine the state of the road in detail by using the acceleration and the temperature of the motor detected by the vehicle 20. Thereby, according to the information system 10, it is possible to provide the information indicating the state of the road to the large number of vehicles 20. Further, according to the information system 10, it is possible to contribute to a road repair plan and a new city plan in the future.

Note that, the vehicle 20 is an example of transportation equipment. The vehicle may be an automobile such as an electric vehicle and a fuel cell vehicle (FCV). The automobile may be any type of an automobile having a running motor, such as a bus, a truck and a two-wheeled motor vehicle. The vehicle may be a saddle-type vehicle and the like, and may be a bicycle with a motor.

FIG. 10 shows an example of a computer 2000 where a plurality of embodiments of the present invention may be entirely or partially embodied. A program that is installed in the computer 2000 can cause the computer 2000 to function as a system such as the communication system of the embodiment, a communication apparatus or each unit of the apparatus, to execute operations associated with the apparatus or each unit of the apparatus and/or to execute the process of the embodiment or steps thereof. Such a program may be executed by a CPU 2012 so as to cause the computer 2000 to execute certain operations associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 is configured to operate according to programs stored in the ROM 2026 and the RAM 2014, thereby controlling each unit.

The communication interface 2022 is configured to communicate with other electronic devices via a network. The flash memory 2024 is configured to store a program and data that are used by the CPU 2012 in the computer 2000. The ROM 2026 is configured to store a boot program or the like that is executed by the computer 2000 at the time of activation, and/or a program depending on hardware of the computer 2000. The input and output chip 2040 may also be configured to connect various input and output units such as a keyboard, a mouse, and a monitor, to the input and output controller 2020 via input and output ports such as a serial port, a parallel port, a keyboard port, a mouse port, a monitor port, a USB port and a HDMI (registered trademark) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and is executed by the CPU 2012. Information processing described in these programs is read into the computer 2000, resulting in cooperation between the programs and the various types of hardware resources described above. An apparatus or a method may be constituted by realizing operation or processing of information according to a use of the computer 2000.

For example, when communication is performed between the computer 2000 and an external device, the CPU 2012 may be configured to execute a communication program loaded onto the RAM 2014 to instruct communication processing to the communication interface 2022, based on processing described in the communication program. The communication interface 2022 is configured, under control of the CPU 2012, to read transmission data stored on a transmission buffer processing area provided in a recording medium such as the RAM 2014 and the flash memory 2024, to transmit the read transmission data to the network, and to write reception data received from the network to a reception buffer processing area or the like provided on the recording medium.

In addition, the CPU 2012 may be configured to cause all or a necessary portion of a file or a database, which has been stored in a recording medium such as the flash memory 2024, to be read into the RAM 2014, thereby executing various types of processing on the data on the RAM 2014. Next, the CPU 2012 is configured to write the processed data back to the recording medium.

Various types of information, such as various types of programs, data, tables, and databases, may be stored in the recording medium and may be subjected to information processing. The CPU 2012 may be configured to execute, on the data read from the RAM 2014, various types of processing including various types of operations, processing of information, conditional judgment, conditional branching, unconditional branching, search and replacement of information, and the like described in the present specification and specified by instruction sequences of the programs, and to write a result back to the RAM 2014. The CPU 2012 may also be configured to search for information in a file, a database and the like in the recording medium. For example, when a plurality of entries, each having an attribute value of a first attribute associated with an attribute value of a second attribute, is media in the recording medium, the CPU 2012 may be configured to search for an entry having a designated attribute value of the first attribute that matches a condition from the plurality of entries, and to read the attribute value of the second attribute stored in the entry, thereby obtaining the attribute value of the second attribute associated with the first attribute that satisfies a predetermined condition.

The programs or software modules described above may be stored in a computer-readable storage medium on or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program that is installed in the computer 2000 and causes the computer 2000 to function as the system 100 may work on the CPU 2012 and the like to cause the computer 2000 to function as each unit of the system 100, respectively. Information processing described in these programs are read into the computer 2000 to cause the computer to function as each unit of the system 100, which is a specific means realized by cooperation of software and the various types of hardware resources described above. Then, with these specific means, by realizing computing or processing of information according to an intended use of the computer 2000 in the present embodiment, the specific system 100 is constructed according to the intended use.

Various embodiments have been described with reference to the block diagrams and the like. In the block diagrams, each block may represent (1) a step of a process in which an operation is executed, or (2) each unit of an apparatus having a role in executing the operation. Certain steps and each unit may be implemented by dedicated circuitry, programmable circuitry supplied with computer-readable instructions stored on computer-readable media, and/or processors supplied with computer-readable instructions stored on computer-readable media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions to be executed by a suitable device, and as a result, the computer-readable storage medium having the instructions stored thereon constitutes at least a part of an article of manufacture including instructions that can be executed to provide means for performing operations specified in the processing procedures or block diagrams. Examples of the computer-readable storage media may include an electronic storage medium, a magnetic storage medium, an optical storage medium, an electromagnetic storage medium, a semiconductor storage medium, and the like. More specific examples of the computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as a 'C' programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to provide means for performing operations specified in the described processing procedures or block diagrams. Examples of a processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, stages and the like of each process performed by an apparatus, system, program, and method shown in the claims, embodiments, or diagrams can be performed in any order as long as the order is not indicated by 'prior to,' 'before,' or the like and as long as the output from a previous process is not used in a later process. Even if the process flow is described using phrases such as 'first' or 'next' in the claims, embodiments, or diagrams, it does not necessarily mean that the process must be performed in this order.

EXPLANATION OF REFERENCES

10: information system
20: vehicle
22: in-vehicle system
70: road
90: communication network
100: system
110: management system
200: position information acquisition unit
210: shaft output information acquisition unit
220: temperature information acquisition unit
230: acceleration information acquisition unit 240: speed information acquisition unit
250: determination unit
260: transmission control unit
262: display instruction unit
270: control unit
280: storage unit
290: communication unit
801: point
802: point
803: point
804: point
805: point
806: point
810: section
900: navigation screen
910: mark
920: mark
2000: computer
2010: host controller
2012: CPU
2014: RAM
2020: input and output controller
2022: communication interface
2024: flash memory
2026: ROM
2040: input and output chip

What is claimed is:

1. A system comprising:
an acceleration information acquisition unit configured to acquire information indicating an acceleration of a vehicle detected by an acceleration sensor mounted on the vehicle;
a shaft output information acquisition unit configured to acquire information indicating a shaft output of a rotating electrical machine mounted on the vehicle;
a position information acquisition unit configured to acquire information indicating a position of the vehicle;
a determination unit configured to determine a state of a road on which the vehicle has run, based on the acceleration of the vehicle, the shaft output, and the position of the vehicle; and
a temperature information acquisition unit configured to acquire information indicating a temperature of the rotating electrical machine, wherein
the determination unit is configured to determine the state of the road as a fourth state when a number of times per a unit time that a vertical direction component of the acceleration exceeds a predetermined first acceleration value is more than a predetermined first number of times, the temperature is equal to or greater than a predetermined second temperature value and a speed of the vehicle is equal to or less than a predetermined speed value.

2. The system according to claim 1, wherein
the determination unit is configured:
to determine the state of the road as a first state when the shaft output is less than a predetermined first shaft output value, and
to determine the state of the road as a second state when a time during which the shaft output is equal to or greater than the first shaft output value is equal to or longer than a predetermined first time and the temperature of the rotating electrical machine is equal to or greater than a predetermined first temperature value.

3. The system according to claim 2, wherein
the determination unit is configured to determine the state of the road as a third state when the time during which the shaft output is equal to or greater than the first shaft output value is shorter than a second time shorter than the first time.

4. The system according to claim 1, further comprising a speed information acquisition unit configured to acquire information indicating the speed of the vehicle, wherein
the determination unit is configured to further determine the state of the road as the fourth state when the number of times per the unit time that the vertical direction component of the acceleration exceeds the predetermined first acceleration value is more than the predetermined first number of times, the temperature is equal to or greater than the predetermined second temperature value, the shaft output is equal to or greater than a predetermined second shaft output value and the speed of the vehicle is equal to or less than the predetermined speed value.

5. The system according to claim 1, wherein
the determination unit is configured to determine the state of the road as a fifth state when a number of times per a unit time that a traveling direction component of the acceleration exceeds a predetermined second acceleration value is more than a predetermined second number of times.

6. The system according to claim 1, wherein
the determination unit is configured to determine the state of the road as a sixth state when a number of times per a unit time that a traveling direction component of the acceleration exceeds a predetermined second acceleration value is more than a predetermined second number of times and the shaft output is equal to or less than a predetermined third shaft output value.

7. The system according to claim 1, wherein
the determination unit is configured to determine the state of the road as a seventh state when a number of times per a unit time that a traveling direction component of the acceleration exceeds a predetermined second acceleration value is more than a predetermined second number of times and an average value of the shaft output in a predetermined time is within a predetermined range.

8. The system according to claim 1, comprising a display instruction unit configured to transmit information, which indicates the state of the road determined by the determination unit, to a plurality of vehicles and to cause the plurality of vehicles to display the state of the road.

9. The system according to claim 8, comprising a transmission control unit configured to transmit the information, which indicates the state of the road determined by the determination unit, to a management system configured to manage the state of the road.

10. The system according to claim 4, comprising a display instruction unit configured to transmit information, which indicates the state of the road determined by the determination unit, to a plurality of vehicles and to cause the plurality of vehicles to display the state of the road, wherein
the determination unit is configured to determine the state of the road as a fifth state when a number of times per a unit time that a traveling direction component of the acceleration exceeds a predetermined second acceleration value is more than a predetermined second number of times, and
the display instruction unit is configured to cause the plurality of vehicles to display the fourth state in a manner different from that of the fifth state.

11. The system according to claim 2, further comprising a speed information acquisition unit configured to acquire information indicating the speed of the vehicle, wherein
the determination unit is configured to further determine the state of the road as the fourth state when the number of times per the unit time that the vertical direction component of the acceleration exceeds the predetermined first acceleration value is more than the predetermined first number of times, the temperature is equal to or greater than the predetermined second temperature value, the shaft output is equal to or greater than a predetermined second shaft output value and the speed of the vehicle is equal to or less than the predetermined speed value.

12. The system according to claim 3, further comprising a speed information acquisition unit configured to acquire information indicating the speed of the vehicle, wherein
the determination unit is configured to further determine the state of the road as the fourth state when the number of times per the unit time that the vertical direction component of the acceleration exceeds the predetermined first acceleration value is more than the predetermined first number of times, the temperature is equal to or greater than the predetermined second temperature value, the shaft output is equal to or greater than a predetermined second shaft output value and the speed of the vehicle is equal to or less than the predetermined speed value.

13. The system according to claim 2, wherein
the determination unit is configured to determine the state of the road as a fifth state when a number of times per a unit time that a traveling direction component of the acceleration exceeds a predetermined second acceleration value is more than a predetermined second number of times.

14. The system according to claim 2, wherein
the determination unit is configured to determine the state of the road as a sixth state when a number of times per a unit time that a traveling direction component of the acceleration exceeds a predetermined second acceleration value is more than a predetermined second number of times and the shaft output is equal to or less than a predetermined third shaft output value.

15. The system according to claim 2, wherein
the determination unit is configured to determine the state of the road as a seventh state when a number of times per a unit time that a traveling direction component of the acceleration exceeds a predetermined second acceleration value is more than a predetermined second number of times and an average value of the shaft output in a predetermined time is within a predetermined range.

16. A system comprising:
a shaft output information acquisition unit configured to acquire information indicating a shaft output of a rotating electrical machine mounted on vehicle;
a temperature information acquisition unit configured to acquire information indicating a temperature of the rotating electrical machine;
a position information acquisition unit configured to acquire information indicating a position of the vehicle; and
a determination unit configured to determine a state of a road on which the vehicle has run, based on the shaft output, the temperature and the position of the vehicle, wherein
the determination unit is configured:
to determine the state of the road as a first state when the shaft output is less than a predetermined first shaft output value, and
to determine the state of the road as a second state when a time during which the shaft output is equal to or greater than the first shaft output value is equal to or longer than a predetermined first time and a temperature of the rotating electrical machine is equal to or greater than a predetermined first temperature value.

17. A method comprising:
acquiring information indicating an acceleration of a vehicle detected by an acceleration sensor mounted on the vehicle;
acquiring information indicating a shaft output of a rotating electrical machine mounted on the vehicle;
acquiring information indicating a position of the vehicle;
determining a state of a road on which the vehicle has run, based on the acceleration of the vehicle, the shaft output, and the position of the vehicle; and
acquiring information indicating a temperature of the rotating electrical machine, wherein
the determining includes determining the state of the road as a fourth state when a number of times per a unit time that a vertical direction component of the acceleration exceeds a predetermined first acceleration value is more than a predetermined first number of times, the temperature is equal to or greater than a predetermined second temperature value and a speed of the vehicle is equal to or less than a predetermined speed value.

* * * * *